United States Patent

Biskner et al.

[11] Patent Number: 6,030,529
[45] Date of Patent: *Feb. 29, 2000

[54] BIOLOGICAL REACTOR INCLUDING SETTLER ASSEMBLY

[75] Inventors: Charles D. Biskner, Ames, Iowa; James C. Young, Springdale, Ark.

[73] Assignee: United States Filter Corporation, Palm Desert, Calif.

[*] Notice: This patent is subject to a terminal disclaimer.

[21] Appl. No.: 09/113,659

[22] Filed: Jul. 10, 1998

Related U.S. Application Data

[63] Continuation-in-part of application No. 08/787,230, Jan. 22, 1997, Pat. No. 5,779,895, which is a continuation of application No. 08/601,685, Feb. 15, 1996, abandoned.

[51] Int. Cl.[7] .................................................. B01D 24/46
[52] U.S. Cl. .......................... 210/274; 210/275; 210/521
[58] Field of Search .................................. 210/274, 275, 210/521, 794

[56] References Cited

U.S. PATENT DOCUMENTS

| | | | |
|---|---|---|---|
| 1,069,737 | 8/1913 | Stevenson | 210/794 |
| 2,888,140 | 5/1959 | Hebert | 210/275 |
| 3,313,420 | 4/1967 | Hirsch | 210/275 |
| 3,491,892 | 1/1970 | McCann | 210/521 |
| 3,666,112 | 5/1972 | Pielkenrood et al. | 210/521 |
| 3,741,401 | 6/1973 | Hsiung | 210/519 |
| 4,076,625 | 2/1978 | Scholten et al. | 210/274 |
| 4,322,299 | 3/1982 | Scholten et al. | 210/794 |
| 4,479,880 | 10/1984 | Treanor | 210/795 |
| 5,154,824 | 10/1992 | Anderson | 210/274 |
| 5,198,108 | 3/1993 | Savall et al. | 210/265 |
| 5,207,905 | 5/1993 | O'Brien et al. | 210/274 |
| 5,227,077 | 7/1993 | Shea | 210/793 |
| 5,286,392 | 2/1994 | Shea | 210/793 |
| 5,779,895 | 7/1998 | Biskner et al. | 210/274 |

*Primary Examiner*—Cynthia L. Nessler
*Attorney, Agent, or Firm*—Michael Best & Friedrich LLP

[57] ABSTRACT

A biological reactor including a settler assembly for reducing loss of biological material during high-turbulence treatment of liquid in the biological reactor. The settler assembly is comprised of plates, tubes, or other porous materials placed between a system of baffles and a collection trough. The settler assembly reduces turbulence near the overflow weir edge of the collection trough, thereby reducing biological material carry over with the treated liquid into the collection trough. The trough baffle settler assembly will allow higher treatment rates with the same or lower losses of biological material than experienced with previous trough-baffle designs, thereby reducing costs of construction and operation of biological reactor systems.

21 Claims, 6 Drawing Sheets

BIOLOGICAL REACTOR INCLUDING SETTLER ASSEMBLY

This application is a continuation-in-part application of application Ser. No. 08/787,230, filed Jan. 22, 1997, now U.S. Pat. No. 5,779,895, which is a file wrapper continuation of application Ser. No. 08/601,685, filed Feb. 15, 1996, now abandoned.

FIELD OF THE INVENTION

The invention relates to biological reactors and, more particularly, to structural arrangements for retaining biological material in such a biological reactor.

BACKGROUND OF THE INVENTION

Granular media filters are commonly used to remove particulate solids from water in water and wastewater treatment plants. These filters typically employ sand, crushed coal, granular activated carbon (GAC), crushed garnet or a combination of these or similar granular materials as filter media. The water to be filtered is passed through the filter media and the particulate solids are trapped at the surface of the filter media and in the interstitial spaces within the filter media. The entrapped particulate solids are removed from the filter media by a periodic washing operation called backwashing in which water or a water/air combination is passed upwardly through the filter media at sufficient velocities to carry the particulate solids upwardly. The backwash water and entrained particulate solids are intercepted by a backwash water collector typically consisting of a pipe or trough. Because of turbulence caused by the backwashing process, grains of the filter media can become entrained in the backwash water stream and are carried over the overflow weir edge of the backwash trough and are removed or lost from the filter. The media loss is particularly severe when using low density media such as crushed coal or when using air to assist in scouring the entrapped particulate solids from the filter.

One prior art granular media filter is shown in U.S. Pat. No. 4,076,625 and includes means intended to reduce media loss and consisting of baffles placed adjacent to or surrounding the backwash trough to intercept and deflect the air used in the backwash process. The baffles reduce the velocity and turbulence of water currents near the overflow weir edge of the backwash trough to thereby reduce media loss.

Biological reactors are commonly used to remove biological nutrients and/or organic materials from water and wastewater in biological treatment plants. These reactors typically employ biological organisms which remove the organic constituents in the wastewater. The reaction causes an accumulation of granulated or flocculated biomass and the production of gas through the conversion of the organic waste constituents to methane and/or carbon dioxide.

A typical biological reactor includes a bed of biological organisms. Wastewater containing organic constituents passes into the reactor and flows upwardly through the bed of biological material. The biological organisms are able to contact and react with a greater portion of the organic constituents in the wastewater.

As the biological organisms react with the constituents in the wastewater, the biological organisms grow and become less dense. Less dense biomass becomes buoyant and rises toward the wastewater collection trough. The upward flow of liquid and the gas produced in the reaction also tends to cause media and biomass to flow upwardly toward the collection trough.

To retain the media and biomass in the biological reactor, a series of overlapping baffles are typically positioned in the upper portion of the reactor. The baffles divert the media and biomass away from the exit zone and collection trough. The baffles reduce the upward velocity of the wastewater so that biomass entering the exit zone settle downwardly and re-enter the biomass zone and biomass bed.

SUMMARY OF THE INVENTION

One problem with existing granular media filters, such as that disclosed in U.S. Pat. No. 4,076,625, is that additional depth is required in the filter system to accommodate installation of the baffling system. While the design of new filter systems allows the additional depth to be accounted for in the design stages, the retrofitting of existing filter systems with the baffles is not always possible due to the limited height available in the filter tanks.

Another problem with existing granular media filters is that the ability of such trough and baffle configurations to eliminate media loss is limited to specific media type, grain size, spatial arrangements of the baffles and the media surface, and the magnitude of air and water rates used for backwashing. For instance, the prior art trough baffle design may increase media loss for filter medias consisting of anthracite coal and GAC due to increased localized velocities created by the baffles.

The granular media filter embodying the present invention has a construction which eliminates shortcomings of prior art trough baffle designs and includes a baffle assembly which minimizes the loss of media during the backwashing process, reduces the height required in the filter to accommodate the baffling system, allows for installation of the baffling system in an existing system and eliminates the need for additional structure height to be added for new systems. The baffle assembly in the granular media filter of the invention includes a settler assembly which provides for reduced localized fluid velocities and more uniform fluid velocity in the collection area adjacent to the overflow weir of the backwash trough.

The granular media filter embodying the invention includes a tank for containing liquid and a bed of filter media for filtering liquid flowing through the bed of filter media, and means for washing the bed of filter media. The means for washing includes means for selectively supplying water or a mixture of air and water into the tank below the bed of filter media and for causing upward flow of fluid through the bed of filter media to clean the media.

The granular filter further includes a backwash trough positioned above the filter media bed and for draining off backwash liquid when fluid is supplied upwardly through the bed of filter media to wash the media. A baffle assembly is provided for controlling upward fluid flow around the backwash trough and for deflecting upwardly flowing air and fluid entrained with media grains away from the backwash trough, the baffle assembly including at least one baffle portion spaced from the backwash trough.

The granular media filter further includes a settler assembly located between the baffle portion and the backwash trough, the settler assembly including means defining a plurality of flow passages for preventing turbulent flow of backwash liquid flowing upwardly between the backwash trough and the baffle plate.

The invention further includes a trough baffle settler assembly for use in a granular media filter including a tank containing a bed of filter media, the trough baffle settler assembly comprising a backwash trough in the upper portion of the tank and for draining off backwash liquid produced during washing of the filter media in the tank. A baffle is also provided for controlling upward flow during washing of the filter media, the baffle located in adjacent spaced relation to the backwash trough and including at least one baffle plate having a portion for deflecting upwardly flowing fluid and entrained media grains away from the backwash trough. A settler assembly is located between the baffle and the backwash trough, the settler assembly including means defining a plurality of flow passages for controlling flow upwardly with respect to the backwash trough and for preventing turbulent flow upwardly between the backwash trough and the baffle plate.

One additional problem with existing biological reactors is that the arrangement of baffles does not effectively prevent the loss of biomass. The excessive loss of biomass causes a concurrent loss of treatment efficiency of the reactor.

The biological reactor embodying the present invention has a construction which eliminates shortcomings of prior art reactors which use conventional baffle designs. The present biological reactor includes a baffle and settler assembly which improves the separation and retention of biomass thereby minimizing the loss of biological material and improving the efficiency of the reaction process, reduces the height required in the reactor to accommodate the baffle and settler assembly, allows for installation of the baffle and settler assembly in an existing reactor and eliminates the need for additional structure height to be added to new systems. The baffle and settler assembly includes a settler assembly which provides for reduced localized fluid velocities and more uniform fluid velocity in the exit or collection area adjacent to the overflow weir of the collection trough.

The biological reactor embodying the invention includes a tank for containing liquid and a bed of flocculated or granulated biological organisms which, in turn, remove organic nutrients from liquid flowing through the bed of microorganisms. The biological reactor also includes means for supplying wastewater into the tank so that the wastewater flows through the bed of biological material. In addition, the biological reactor includes a collection trough for collecting treated wastewater and a baffle assembly for controlling upward fluid flow around the collection trough and for deflecting upwardly flowing fluid and biological material away from the collection trough.

The biological reactor also includes a settler assembly located between the baffle portion and the collection trough. The settler assembly includes means defining at least one row of flow passages for controlling upward fluid flow adjacent the collection trough and preventing turbulent flow of liquid from flowing upwardly between the collection trough and the baffle portion. The row of flow passages is between the collection trough and the baffle portion and extends along the length of the collection trough. The row of flow passages is divided into a plurality of discrete and separate flow passages. The flow passages are separated with respect to one another and spaced substantially along the length of the collection trough. Preferably, the means defining at least one row of flow passages defines a plurality of rows of flow passages.

Other features and advantages of the invention will become apparent to those skilled in the art upon review of the following detailed description, claims and drawings.

Before several embodiments of the invention are explained in detail, it is to be understood that the invention is not limited in its application to the details of construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF A PREFERRED EMBODIMENT

Figure 1:
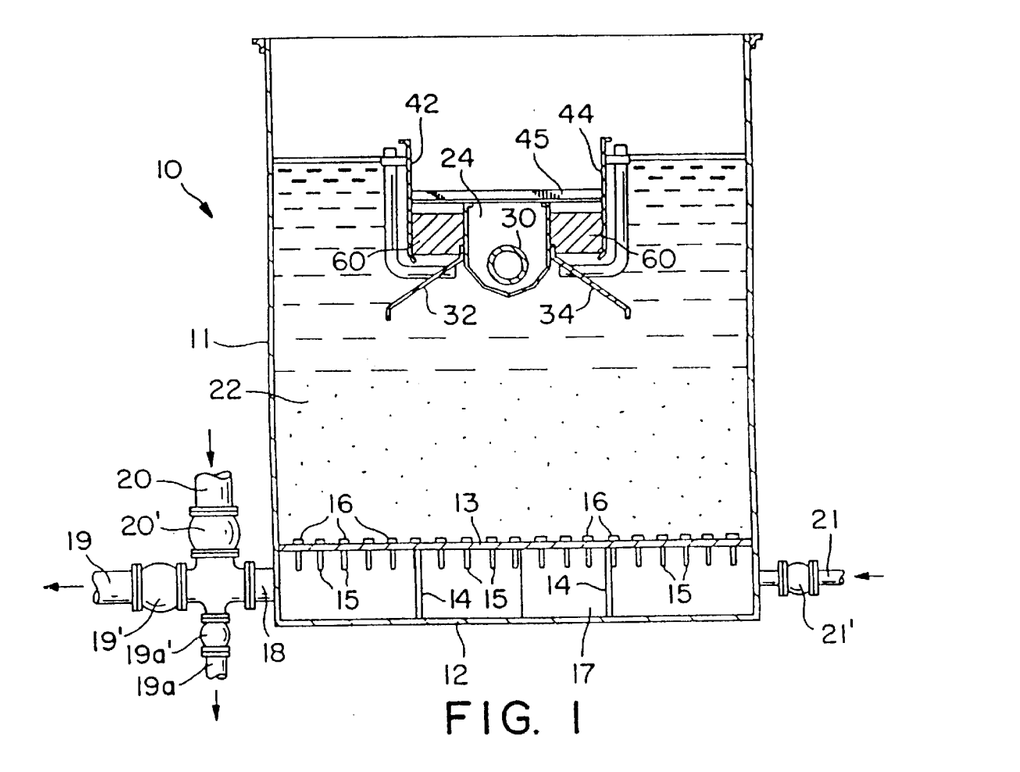
FIG. 1 is a cross section elevation view of an apparatus, such as a granular media filter, embodying the invention.

Illustrated in FIG. 1 is an apparatus, such as a granular media filter, for treating liquid, such as water or wastewater, and embodying the invention. The granular media filter includes a tank 10 having a top, side walls 11, and a closed bottom 12. Spaced upwardly from bottom 12 is an underdrain plate 13, supported by bracing 14 and connected to the tank sidewalls 11 by welding or other suitable means to form a water-tight seal therebetween. Extending through plate 13 are a plurality of nozzle tubes 15 having strainer caps 16 on the top thereof above plate 13. A granular media bed 22 comprised of granular filtering materials, such as sand, sand and gravel, coal, garnet, GAC etc. is provided above the underdrain plate 13. The granular media bed 22 may also be comprised of several different granular filtering materials, such as granular materials of different average size, different density, or combinations thereof, etc. The granular media bed 22 is used to remove particulate solids from a water stream by passing the water to be filtered downwardly through the granular media bed 22. During downflow filtration the water to be filtered passes downwardly through the media bed, through the strainers 16 and the nozzles 15 into the underdrain chamber 17 and is removed through pipe connection 18 to the filtered water outlet pipe 19. A drainpipe 19a is also provided.

During operation of the granular media filter 10, it is necessary to periodically remove the filtered material from the granular media bed 22 by washing the media. During washing, water is supplied under pressure through pipe 20 to pipe 18 and chamber 17 for passing upwardly through nozzle tubes 15 and strainers 16. Also during washing, air is preferably supplied under pressure through pipe 21 which connects with underdrain chamber 17. Air enters the nozzles through holes in the upper portions of nozzle tubes 15 while water enters through the lower ends of the nozzle tubes. Alternate means of adding the air to the filter can be used, for example, as through a distribution grid placed within or immediately below the granular media filter bed 22. The pipes 19, 19a, 20 and 21 are commonly provided with separate shut-off valves 19', 19a', 20' and 21', respectively.

The entrapped particulate solids are removed from the filter granular media by the action of passing the water or a combination of water and air upwardly through the filter media bed 22 until the entrapped particulate solids are released from the media. The mixture of water, air, and particulate solids flows upwardly and the water and particulate solids are removed through a trough 24 extending across an upper portion of the tank 10, the trough 24 being supported at its opposite ends (not shown) by the upper portion of the tank.

Figure 2:
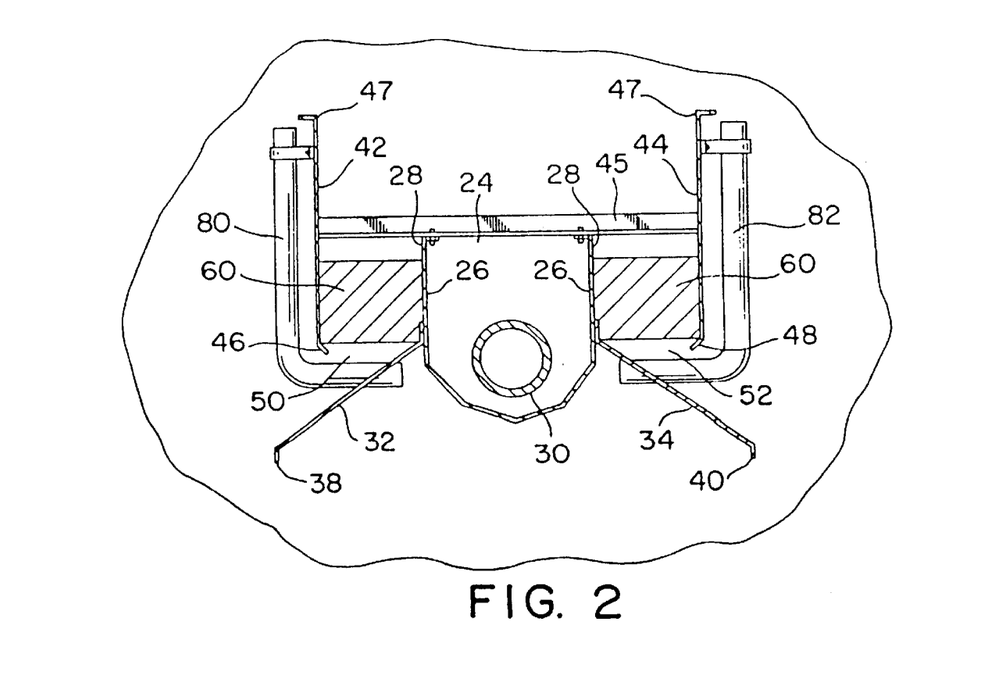
FIG. 2 is an enlarged cross section view of the trough and baffle assembly of the granular media filter shown in FIG. 1 and including the settler assembly.

The trough 24 is shown in greater detail in FIG. 2 and includes opposite vertical sides 26 and is open at the top. The upper edges 28 of the sides 26 of the trough 24 function as overflow weirs to permit flow of liquid and particulate solids into the trough 24 to be carried away through the discharge pipe 30. A pair of baffles 32 and 34 are fixed to opposite sides of the trough 24 and adjacent lower portions of the vertical sides 26. The baffles 32 and 34 in the illustrated arrangement of FIG. 2 extend downwardly and away from the lower portions of the vertical sides 26. The baffle 32 includes a lower edge 38. The other baffle 34 similarly includes a lower edge 40. The baffles 32 and 34 function to deflect the flow of water and entrained particulate solids and air bubbles upwardly and outwardly away from the trough 24. During the media cleaning operation, introduction of air into the upwardly flowing water has the effect of causing turbulence in the media to better separate filtered material from the media, but the increased turbulence in the upwardly flowing water can also function to carry media particles upwardly and into the trough 24. The baffles 32 and 34 function to deflect the flow of water and air bubbles outwardly away from the trough 24 and to permit the media particles to settle back into the media bed 22 rather than being carried into the trough 24 with the wash water.

In the arrangement shown in FIG. 2, a second pair of baffles 42 and 44 are positioned above the baffles 32 and 34, respectively, and are spaced outwardly from the sides of the trough 24. The baffle 42 extends generally vertically and includes a lower edge 46 spaced upwardly from an intermediate portion of the downwardly extending baffle 32. The baffle 44 also extends generally vertically and has a lower edge 48 spaced upwardly from an intermediate portion of baffle 34. In the specific embodiment of the invention shown in FIGS. 1 and 2, the baffles 42 and 44 are supported by a horizontally extending brace member 45 in turn supported by the trough 24. The upper edges 47 of the vertical baffles 42 and 44 extend upwardly above the upper edges of the trough 24. The vertical baffles 42 and 44 are intended to prevent flow of water at the water surface toward the trough 24. Accordingly, the water or liquid flowing into the trough 24 must flow through the space or flow channel 50 between the lower edge 46 of the vertical baffles 42 and the upper surface of the downwardly inclined baffle 32 and through the flow channel 52 between lower edge 48 of baffle 44 and baffle 34.

Figure 3:
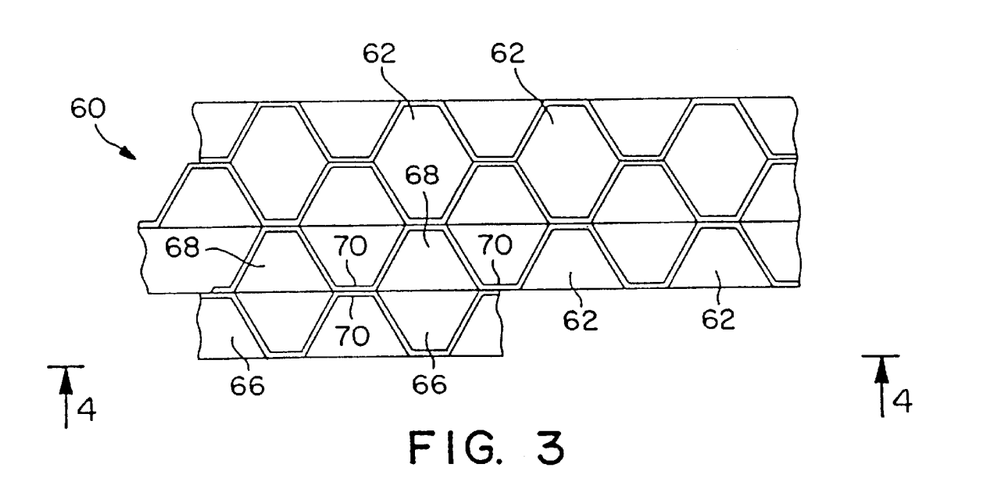
FIG. 3 is an enlarged plan view of the settler assembly shown in FIG. 2.
Figure 4:
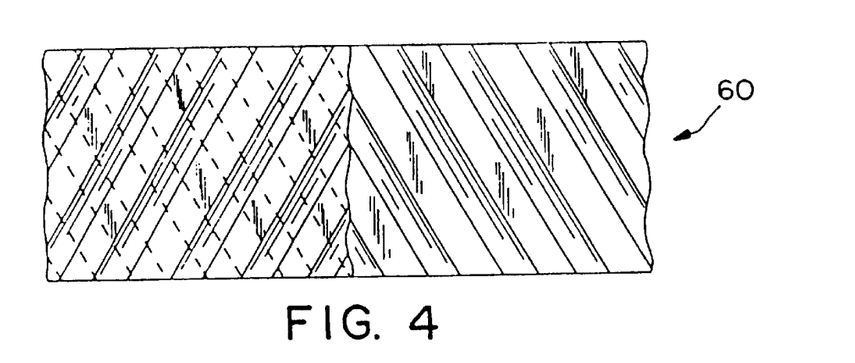
FIG. 4 is an enlarged elevation view of the settler assembly shown in FIG. 2 and with the portions broken away.
Figure 5:
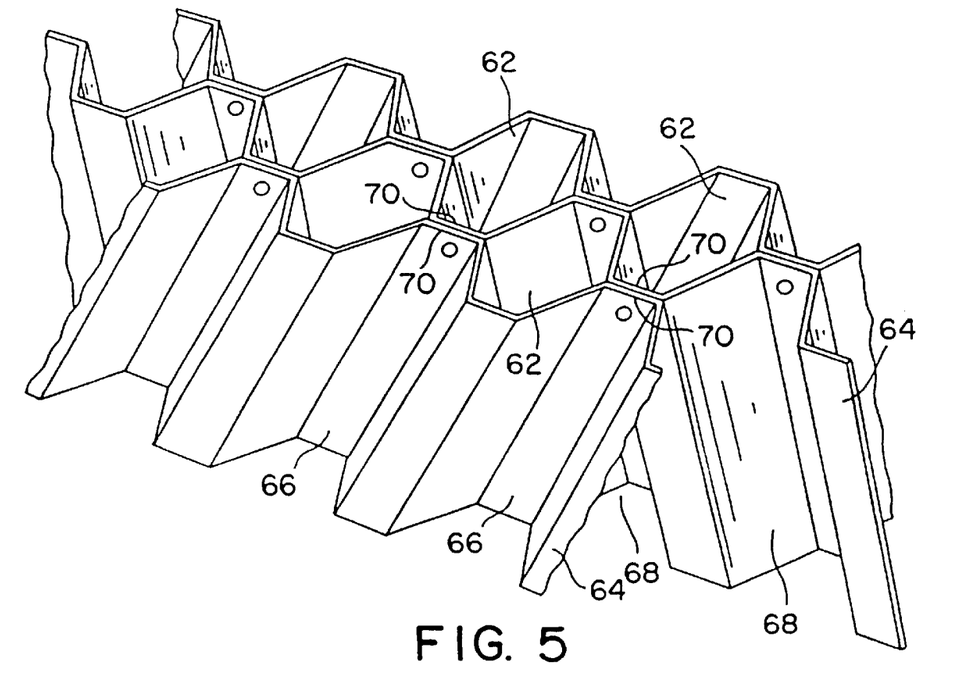
FIG. 5 is an enlarged perspective view of the settler assembly shown in FIGS. 3 and 4.

Means are also provided for controlling turbulence and for dissipating the local velocities in the liquid flowing upwardly through the flow channels 50 and 52 and to prevent media entrained in that liquid from flowing into the overflow trough 24. This means includes a pair of settler assemblies 60 positioned above the downwardly inclined baffles 32 and 34, respectively, and between the vertical baffles 42 and 44 and the vertical sidewalls of the trough 24. Each settler assembly 60 includes an array of upwardly inclined channels or passages 62 (FIGS. 3–4) permitting fluid flow upwardly and over the edges of the trough by providing for uniform fluid flow and reducing turbulence in the liquid as it flows through the flow channels and over the upper edges of the trough 24. While the array of upwardly extending channels or passages 62 could be provided in other ways than those shown in the drawings, in the illustrated arrangement, the settler assembly is comprised of a plurality of plates or sheets 64 of corrugated material, the sheets 64 being placed together in face-to-face relation and fixed together. As best shown in FIGS. 3, 4 and 5, the sheets 64 are positioned together in stacked relation and such that the corrugations or channels 66 (FIG. 5) of a first set of alternate sheets 64 are inclined upwardly and parallel to the trough and the corrugations 68 of the adjacent alternate sheets 64 are inclined upwardly and parallel to the trough 24 such that the stacked alternate sheets 64 of corrugated material define flow passages 62 extending upwardly but inclined in opposite directions. In the illustrated arrangement, the corrugations are inclined upwardly at an angle of approximately 45° to 60°.

In one preferred form of the invention, the settler assembly 60 can be comprised of a corrugated media as shown in FIGS. 3–5 and comprising crossflow tube settler modules manufactured by Enviropax, Salt Lake City, Utah. The Enviropax crossflow tube settler modules are comprised of thin sheets 64 of plastic material, each sheet having a wavelike or corrugated configuration, and with one sheet 64 bonded to another sheet by joining the apexes 70 of one sheet to the apexes 70 of waves of the adjacent sheet 64 as best illustrated in FIG. 5.

In the arrangement illustrated in FIG. 2, means are also provided for exhausting air bubbles which are captured beneath the downwardly inclined baffle plates 32 and 34. This means comprises a pair of tubes 80 and 82 having lower ends extending through the baffle plates 32 and 34, respectively, and upper ends outwardly of the vertical baffles 42 and 44 and above the surface of the liquid in the tank.

Figure 6:
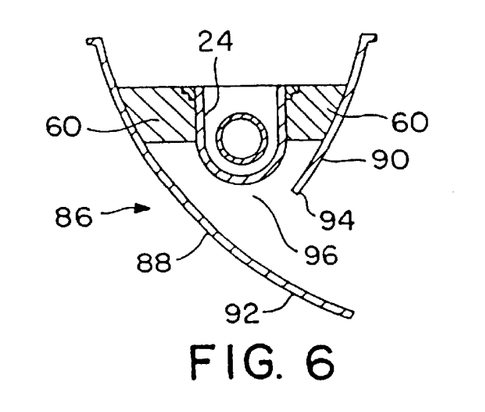
FIG. 6 is an illustration of an alternative embodiment of the trough baffle settler assembly shown in FIG. 2.

FIG. 6 illustrates an alternative embodiment of the invention and wherein a baffle assembly 86 is comprised of a pair of curved baffle plates 88 and 90, one of the baffle plates 88 being curved and having a lower end 92 extending downwardly under the trough 24 and the second curved baffle plate 90 positioned on the opposite side of the trough 24 and having a lower edge 94 positioned in spaced relation but adjacent the lower edge of the trough 24. A flow channel 96 is provided between the two baffle plates 88 and 90 to permit overflow liquid to flow into the trough 24. Settler assemblies 60 are provided between the baffle plate 88 and the trough 24 and between the baffle plate 90 and the trough 24.

Figure 7:
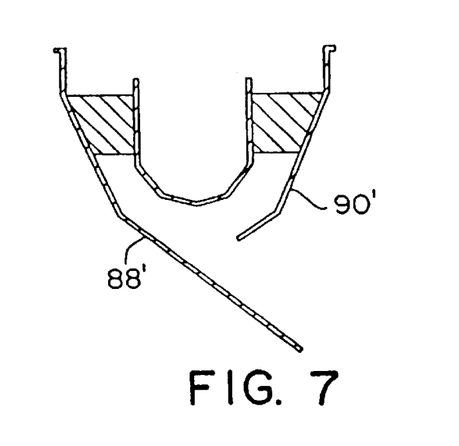
FIG. 7 is an illustration of another alternative embodiment of the trough baffle settler assembly shown in FIG. 2.

An alternative embodiment of the invention is illustrated in FIG. 7, similar to that shown in FIG. 6 and wherein the baffle plates 88' and 90' have an angular configuration.

Figure 8:
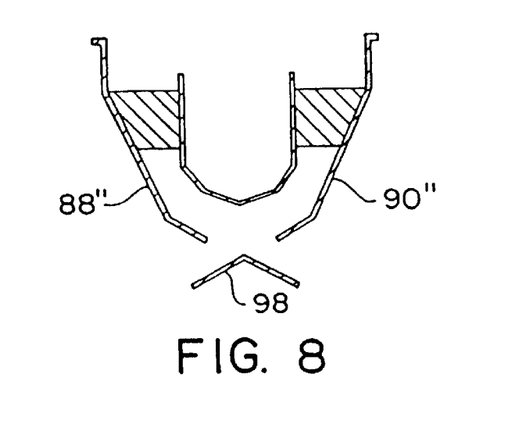
FIG. 8 is an illustration of another alternative embodiment of the trough baffle settler assembly shown in FIG. 2.

Another alternative embodiment of the baffle configuration is shown in FIG. 8 and wherein a deflector baffle 98 is positioned immediately below the trough 24 and functions to divert air and liquid entrained with media grains upwardly and outwardly away from the trough 24 and away from a pair of baffles 88" and 90".

Figure 9:
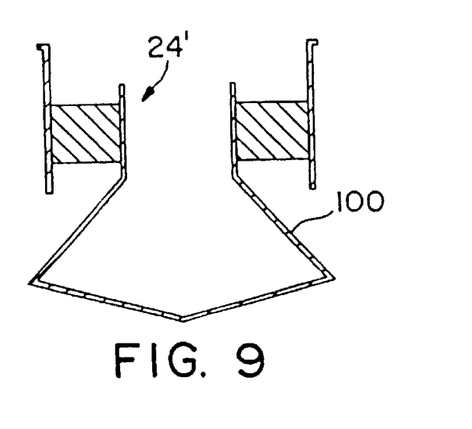
FIG. 9 is an illustration of another alternative embodiment of the trough baffle settler assembly shown in FIG. 2.

FIG. 9 illustrates another alternative embodiment of a baffle configuration and wherein the bottom portion of the trough 24' includes an integral baffle arrangement 100 for diverting upward flow of air and liquid entrained with media grains outwardly and away from the upper edges of the trough 24' and outwardly away from vertically extending baffles 42 and 44.

Figure 10:
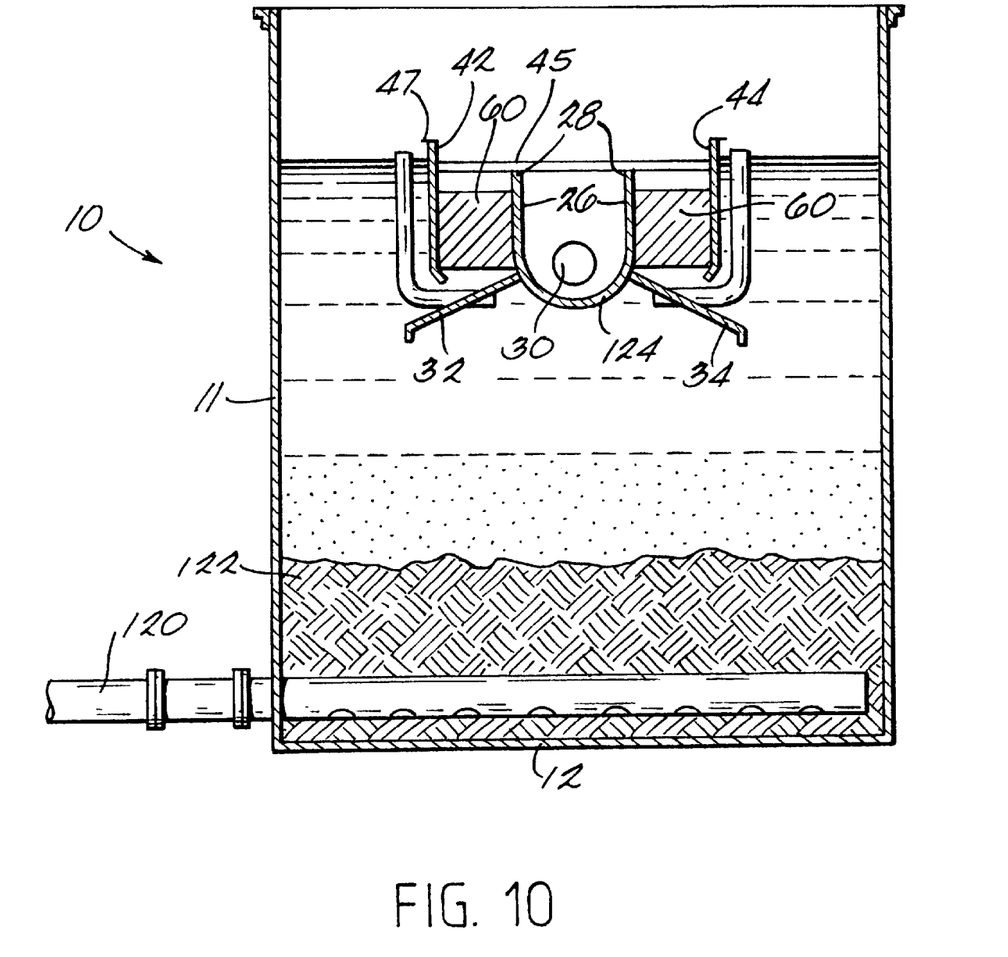
FIG. 10 is a cross section elevation view of a biological reactor that is an alternative embodiment of the apparatus shown in FIG. 1.

Illustrated in FIG. 10 is an apparatus, such as a biological reactor, embodying the invention. Except as otherwise described, the biological reactor is identical to the granular media filter and will not be described in detail. Like elements are identified using like reference numbers.

Means for supplying wastewater including a supply pipe 120 are connected to the sides 11 of the tank 10. A bed 122 of biological material in flocculated, granulated, or otherwise contained form is provided near the bottom 12 of the tank 10 so that the wastewater flows through and the bed 122 of biological material. The biological material forms a biomass bed and reacts with organic constituents in the wastewater to remove these constituents from the wastewater.

It should be understood that the biological reactor of the present invention could be used in any type of biological reactor system, such as an upflow anaerobic sludge blanket reactor or a high rate anaerobic sludge blanket reactor. Further, it should be understood that, in other constructions, the present invention could be used in a fluidized bed reactor, in which the biological material is supported by media, such as sand, carbon or coal.

The biological reactor also includes a collection trough 124 extending across an upper portion of the tank 10. The collection trough 124 is similar to the backwash trough 24 in the granular media filter. The upper edges 28 of the sides 26 of the collection trough 124 function as overflow weirs to permit flow of treated wastewater and particulate solids into the collection trough 124 to be carried away through the discharge pipe 30.

During the operation of the biological reactor, the reaction of the biological material with the organic constituents in the wastewater causes biological growth to occur and to accumulate as granulated or flocculated biomass. Gas is produced simultaneously through the conversion of organic waste constituents to methane and carbon dioxide. As the biological material grows, it becomes less dense and more buoyant. The upward velocity of the treated wastewater and the gas also tends to carry some biomass upwardly toward the exit zone and the collection trough 124.

The biological reactor also includes an arrangement of baffles that is similar to that in the granular media filter. The arrangement of baffles function to deflect the flow of treated wastewater and gas outwardly away from the collection trough 124 and to permit the biomass to settle back into the biomass bed 122 rather than being carried into the collection trough 124 with the treated wastewater. The baffle arrangement includes the first and second pairs of baffles 32 and 34 and 42 and 44, respectively. In other embodiments, the baffle arrangement may be similar to those constructions illustrated in FIGS. 6–9.

The biological reactor also includes means for controlling turbulence and for dissipating the local velocities in the treated wastewater flowing upwardly through the flow channels 50 and 52 and to prevent biomass entrained in that wastewater from flowing into the collection trough 124. This means includes the pair of settler assemblies 60 positioned above the baffles 32 and 34, respectively, and between the vertical baffles 42 and 44 and the vertical sidewalls 26 of the collection trough 124. In one embodiment, the settler assemblies 60 are similar to those shown in FIGS. 3–5.

Figure 11:
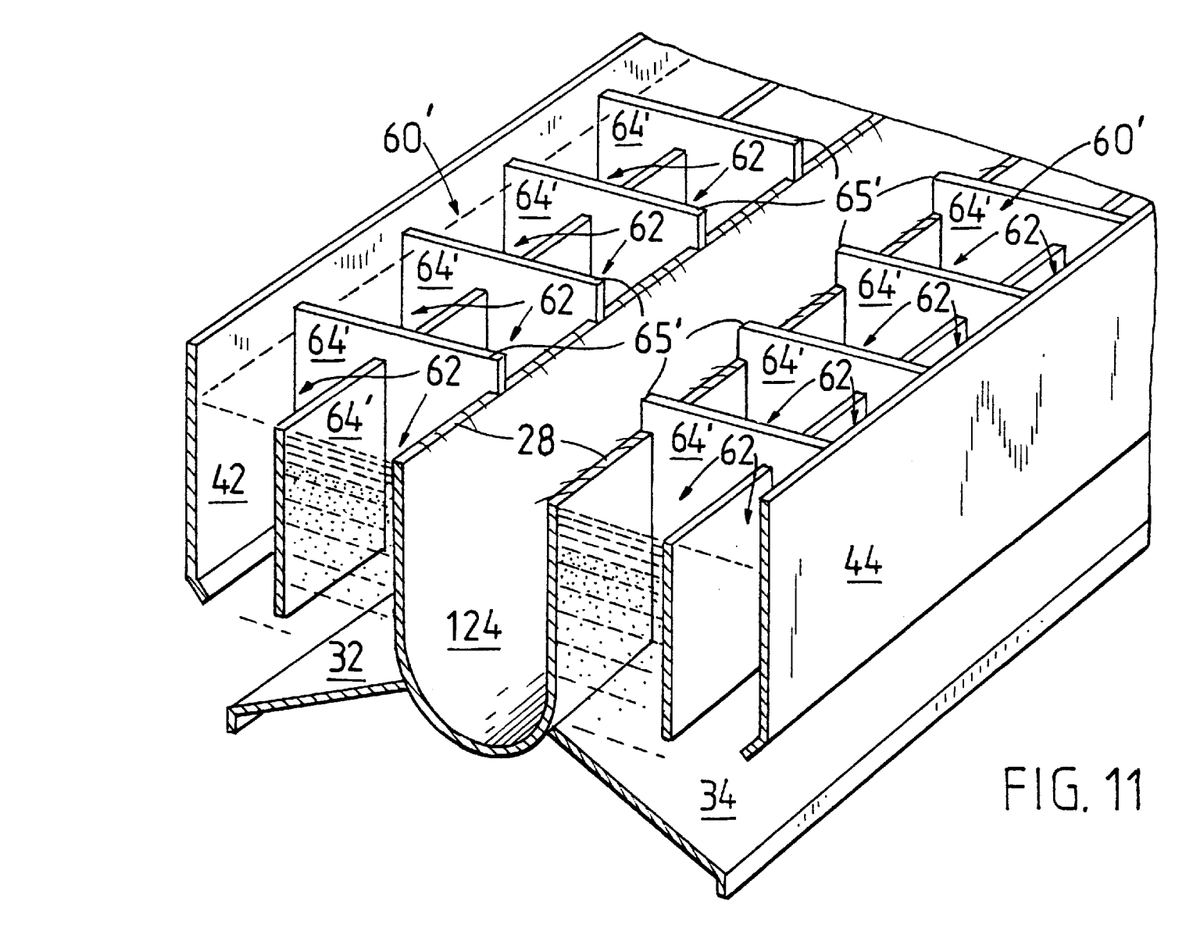
FIG. 11 is a partial cross section perspective view of another embodiment of the trough baffle settler assembly shown in FIGS. 2 and 10.

Another embodiment of the settler assemblies 60' is shown in FIG. 11. Each settler assembly 60' includes means defining at least one row of flow passages 62. A plurality of mutually adjacent plates or sheets 64' define the flow passages 62. The plates 64' define the sidewalls of the flow passages 62. The upper edges 65' of the sidewalls of the flow passages 62, and that are transverse to the direction of the length of the trough 124, preferably extend above the upper edge 28 of the trough 124. As a result, the flow of backwash water in a direction parallel to the length of the trough 124 is inhibited.

In operation (see FIG. 10), wastewater is supplied to the biomass bed 122 trough supply pipe 120. In the reactor zone, the biomass reacts with the organic constituents in the wastewater creating granulated or flocculated biomass and gas. The wastewater, gas and buoyant biomass flow upwardly and inwardly into a clarifier zone in which the biomass is separated from the wastewater and gas. The wastewater, gas and any remaining biomass are deflected outwardly of the baffles 32 and 34 away from the exit zone and collection trough 124.

Wastewater exiting the biological reactor enters the settler assemblies 60 (or 60') through the flow channels 50 and 52. The wastewater flows through the flow passages 62 further dissipating the local velocities in the wastewater so that biomass is separated from the wastewater and settles to the biomass bed 122. The wastewater flows into the collection trough 124 and is removed through the collection pipe 30.

The baffle arrangement and the settler assemblies 60 (or 60') thus greatly increase the separation and retention of biomass in the upflow biological reactor and also improve the efficiency of the wastewater treatment.

Various features and advantages of the invention are set forth in the following claims.

What is claimed is:

1. A biological reactor apparatus for treating liquid, said apparatus comprising:

a tank having an upper portion and a bottom for containing liquid and a bed of media for treating liquid flowing through the bed of media, biological material for treating liquid flowing therethrough, a collection trough in the tank positioned above the bed of media for draining off and collecting treated liquid when fluid is supplied through the bed of media, the collection trough having a length and including a lower portion and upwardly extending sides, at least one of the sides having an upper edge defining a weir, a baffle assembly for controlling upward fluid flow around the collection trough and for deflecting upwardly flowing fluid and entrained media grains away from the collection trough, the baffle assembly including at least one baffle portion spaced from the collection trough, and a settler assembly located between the baffle portion and the collection trough, the settler assembly including means defining at least one row of flow passages for controlling upward fluid flow adjacent the collection trough and preventing turbulent flow of liquid flowing upwardly between the collection trough and said baffle portion, the row of flow passages being between the collection trough and the baffle portion, the row of flow passages extending along the length of the collection trough and the row of flow passages each being divided into a plurality of discrete and separate flow passages, the flow passages being separated with respect to one another and spaced substantially along the length of the collection trough.

2. An apparatus as set forth in claim 1 and further comprising means for supplying the liquid to be treated into the bed of media so that the liquid flows through the bed of media.

3. An apparatus as set forth in claim 1 wherein the means defining at least one row of flow passages includes a means for defining a plurality of alternately upwardly slanting upwardly inclined flow passages, wherein each of the flow passages is inclined with respect to the vertical direction, wherein each of the flow passages is inclined in a direction transverse to the length of the collection trough, and wherein one of the flow passages is inclined in the direction transverse to the length of the collection trough towards the collection trough and the adjacent flow passage is inclined in the direction transverse to the length of the collection trough away from the collection trough.

4. An apparatus as set forth in claim 3 wherein each flow passage has a plurality of walls defining the flow passage and wherein one of the walls of each flow passage is aligned in parallel relation to another of the walls of that flow passage.

5. An apparatus as set forth in claim 1 wherein the collection trough includes opposite ends, wherein the means defining at least one row of flow passages includes a means for defining a plurality of alternately upwardly slanting upwardly inclined flow passages, wherein each of the flow passages is inclined with respect to the vertical direction, wherein each of the flow passages is inclined in a direction parallel to the length of the collection trough, and wherein one of the flow passages is inclined in the direction parallel to the length of the collection trough towards one opposite end of the collection trough and the adjacent flow passage is inclined in the direction parallel to the length of the collection trough toward the other opposite end of the collection trough.

6. An apparatus as set forth in claim 1 wherein the means defining at least one row of flow passages includes a plurality of mutually adjacent plates.

7. An apparatus as set forth in claim 6 wherein the means defining at least one row of flow passages defines a plurality of rows of flow passages, wherein the plurality of mutually adjacent plates defines at least one of the plurality of rows of flow passages, and wherein at least one of the mutually adjacent plates has a corrugated configuration dividing said at least one of said plurality of rows of flow passages into said plurality of discrete and separate flow passages.

8. An apparatus as set forth in claim 6 wherein the settler assembly is positioned between the second baffle portion and the collection trough.

9. An apparatus as set forth in claim 1 wherein the baffle assembly includes a baffle plate positioned in spaced adjacent relation to the lower portion of the collection trough and deflecting upwardly flowing liquid away from the collection trough and a second baffle portion extending generally vertically and spaced outwardly from the other side of the collection trough, the second baffle portion having an upper portion extending above the liquid so that the liquid cannot flow over the upper portion of the second baffle, the second baffle portion being spaced above the baffle plate and defining a flow passage therebetween.

10. A trough baffle settler assembly for use in a biological reactor including a tank, the tank containing a bed of biological material and having an upper portion, the trough baffle settler assembly comprising:

a collection trough in the upper portion of the tank and for draining off liquid supplied through and treated by the biological material, the collection trough having a length and including a lower portion and upwardly extending sides, at least one of the sides having an upper edge defining a weir, a baffle for controlling upward fluid flow of liquid supplied through the bed of biological material, the baffle located in adjacent spaced relation to the collection trough and including at least one baffle plate having a portion for deflecting upwardly flowing liquid and entrained biological material away from the collection trough, and a settler assembly located between the baffle and the collection trough, the settler assembly including means defining a plurality of rows of flow passages for controlling fluid flow upwardly with respect to the collection trough and for preventing turbulent flow of liquid flowing upwardly between the collection trough and baffle plate, a plurality of rows of flow passages being between the baffle and the collection trough, the rows of flow passages extending along the length of the collection trough, and the rows of flow passages each being divided into a plurality of discrete and separate flow passages, the flow passages being separated with respect to one another and spaced substantially along the length of said collection trough.

11. A trough baffle settler assembly as set forth in claim 10 wherein the means defining a plurality of rows of flow passages includes means for defining a plurality of alternately slanting upwardly inclined flow passages.

12. A trough baffle settler assembly as set forth in claim 11 wherein each flow passage has a plurality of walls defining the flow passage and wherein one of the walls of each flow passage is aligned in parallel relation to another of the walls of that flow passage.

13. A trough baffle settler assembly as set forth in claim 10 wherein the means defining a plurality of rows of flow passages includes a plurality of spaced apart plates.

14. A trough baffle settler assembly as set forth in claim 13 wherein the plurality of spaced apart plates are positioned in side-by-side relation and are generally vertically oriented, and wherein at least one of the plates has a corrugated configuration defining said plurality of discrete and separate flow passages.

15. A trough baffle settler assembly as set forth in claim 10 wherein the baffle includes a pair of baffle plates, one of the baffle plates projecting downwardly away from one side of the collection trough and the other of the baffle plates projecting downwardly and away from the other side of the collection trough.

16. A trough baffle settler assembly as set forth in claim 10 wherein the first-mentioned baffle plate projects downwardly away from one side of the collection trough, wherein the baffle includes a second baffle plate extending generally vertically and spaced outwardly from the one side of the collection trough, the second baffle plate having a lower edge spaced upwardly from the first-mentioned baffle plate and defining a flow passage therebetween, and the second baffle plate having an upper edge extending above the upper edge of the side of the collection trough and extending above the liquid to prevent liquid from flowing over the upper edge of the second baffle plate, and wherein the settler assembly is positioned between the second baffle plate and the collection trough.

17. A trough baffle settler assembly for use in a biological reactor including a tank, the tank containing a bed of biological material and having an upper portion, the trough baffle settler assembly comprising:

a collection trough in the upper portion of the tank and for draining off liquid supplied through and treated by the biological material, the collection trough having a length and including a lower portion and upwardly extending sides, at least one of the sides having an upper edge defining a weir, a baffle for controlling upward flow of liquid, the baffle located in adjacent spaced relation to the collection trough, the baffle including at least two baffle plates, one of the baffle plates projecting downwardly away from one side of the collection trough, at least one baffle plate having a portion for deflecting upwardly flowing liquid and entrained media away from the collection trough, a second one of the baffle plates extending generally vertically and spaced outwardly from the one side of the collection trough, the second one of the baffle plates having a lower edge spaced upwardly from said one of the baffle plates and defining a flow passage therebetween, and the second one of the baffle plates having an upper edge extending above the upper edge of the side of the collection trough and extending above the liquid to prevent liquid from flowing over the upper edge of the second one of the baffle plates, and a settler assembly located between the second one of the baffle plates and the collection trough, the settler assembly including means defining at least one row of flow passages for controlling flow of liquid upwardly with respect to the collection trough and for preventing turbulent flow of liquid flowing upwardly between the collection trough and baffle plate, the row of flow passages being between the baffle and the collection trough, the row of flow passages extending along the length of the collection trough, and the row of flow passages each including a plurality of discrete and separate flow passages, the flow passages being separated with respect to one another and spaced substantially along the length of said collection trough.

18. A trough baffle settler assembly as set forth in claim 17 wherein the means defining at least one row of flow passages includes means for defining a plurality of alternately slanting upwardly inclined flow passages.

19. A trough baffler settler assembly as set forth in claim 18 wherein each flow passage has a plurality of walls defining the flow passage and wherein one of the walls of each flow passage is aligned in parallel relation to another of the walls of that flow passage.

20. A trough baffle settler assembly as set forth in claim 17 wherein the means for defining at least one row of flow passages includes a plurality of spaced apart plates, the plates defining therebetween a plurality of generally vertically upwardly extending channels between the plates.

21. A trough baffle settler assembly as set forth in claim 20 wherein the means defining at least one row of flow passages defines a plurality of rows of flow passages, wherein the plurality of spaced apart plates are positioned in side-by-side relation and are generally vertically oriented, and wherein at least one of the plates has a corrugated configuration and defines a plurality of generally vertically extending channels.

* * * * *